(12) United States Patent  (10) Patent No.: US 6,252,316 B1
Fujie  (45) Date of Patent: Jun. 26, 2001

(54) COIL APPARATUS FOR A LINEAR-MOTOR RAILWAY SYSTEM

(75) Inventor: Junji Fujie, Tokyo (JP)

(73) Assignee: Takaoka Electric Mfg. Co., Ltd. (JP)

( * ) Notice: Subject to any disclaimer, the term of this patent is extended or adjusted under 35 U.S.C. 154(b) by 0 days.

(21) Appl. No.: 09/289,670

(22) Filed: Apr. 12, 1999

(30) Foreign Application Priority Data

Oct. 28, 1998 (JP) .................................. 10-307493

(51) Int. Cl.[7] .......................... H02K 41/00; B60L 13/10
(52) U.S. Cl. .................. 310/12; 310/13; 104/288; 104/290; 104/292
(58) Field of Search .................... 310/12, 13; 104/288, 104/290, 292, 293

(56) References Cited

U.S. PATENT DOCUMENTS

| | | | | |
|---|---|---|---|---|
| 3,890,906 | * | 6/1975 | Maki | 104/281 |
| 4,913,059 | | 4/1990 | Fujie | 104/282 |
| 5,189,961 | * | 3/1993 | Fujie | 104/281 |
| 5,213,047 | * | 5/1993 | Fujiwara et al. | 104/281 |
| 5,293,824 | | 3/1994 | Fujie | 104/282 |
| 5,361,707 | | 11/1994 | Fujie | 104/281 |
| 5,586,504 | * | 12/1996 | He et al. | 104/282 |

OTHER PUBLICATIONS

Yamaguchi, LD–89–27 "Propulsion Ground–Coil Arrangement and Electromagnetic Force Fluctuation of Superconductive Magnetic Levitation Car.", Oct. 1989.*

* cited by examiner

Primary Examiner—Burton Mullins
(74) Attorney, Agent, or Firm—Lorusso & Loud

(57) ABSTRACT

A coil apparatus for a linear-motor railway system comprises six superconductive coils mounted on a bogie of a vehicle at a predetermined pitch such that N and S poles are alternately formed; ground coils disposed on either side wall of a guide, each of the ground coils providing propulsion, levitation, and guide functions, and each set of three ground coils corresponding to a pair of adjacent superconductive coils that form N and S poles; and a feeder circuit connected to the ground coils. The coil apparatus can decrease the number of ground coils in order to decrease man-hour required for installation, and to facilitate inspection and maintenance of contact points through reduction in the number of the connection points.

2 Claims, 9 Drawing Sheets

COIL APPARATUS FOR A LINEAR-MOTOR RAILWAY SYSTEM

BACKGROUND OF THE INVENTION

1. Field of the Invention

The present invention relates to a coil apparatus for a linear-motor railway system (magnetic levitation railway system).

2. Description of the Related Art

Conventional linear-motor railway systems have employed coil apparatuses of the following schemes in order to propel (P), levitate (L) and guide (G) railway vehicles.

Scheme (1): Propulsion/guide coils each providing propulsion and guide functions are disposed on opposite sidewalls of a guideway, and separate levitation coils are disposed on the bottom surface of the guideway.

Scheme (2): Separately from propulsion coils, levitation/guide coils each providing levitation and guide functions are disposed on opposite sidewalls of a guideway.

Scheme (3): Propulsion/levitation/guide coils each providing propulsion, levitation, and guide functions are disposed on opposite sidewalls of a guideway (hereinafter referred to as a "PLG scheme").

An example arrangement of conventional coil apparatuses will be described.

FIG. 1 is a schematic diagram showing the arrangement of superconductive coils on a vehicle of a conventional linear-motor railway system, as well as the arrangement of ground coils on the ground. FIG. 2 is a schematic diagram showing the arrangement of the superconductive coils on the vehicle of the conventional linear-motor railway system. Here, Scheme (2) is employed, in which, separately from propulsion coils, levitation/guide coils each providing levitation and guide functions are disposed on opposite sidewalls of a guideway.

In these drawings, reference numeral 100 denotes a vehicle of a linear-motor railway system (the length $L_1$ of the vehicle is 21.6 meters). Reference numeral 101 denotes a bogie for the vehicle (the length $L_2$ of the bogie is 5.4 meters). Reference numeral 102 denotes superconductive coils disposed on the bogie 101. In this example, four superconductive coils 102 are mounted at a pitch of 1.35 meters such that N-poles and S-poles are formed alternately.

On the ground side, as shown in FIG. 1 three-phase propulsion coils 111 are disposed to form two layers, and levitation/guide coils 112 are disposed at a pitch of 0.45 meter. The propulsion coils 111 and levitation/guide coils 112 form a ground coil 110. Electric power is supplied to the propulsion coils 111 from a triple feeder circuit 120.

In such a conventional scheme, since the propulsion coils 111 are independent of the levitation/guide coils 112, the vehicle can be driven stably, and high reliability is attained in levitation and guide functions.

However, in the above-described conventional scheme as shown in FIG. 1, a large number of propulsion coils 111 and a large number of levitation/guide coils 112 per unit distance must be disposed on the ground. Therefore, the number of man-hour required for installation increases, and the number of connection points also increases, resulting in increased difficulty in inspection and maintenance of the contact points.

SUMMARY OF THE INVENTION

An object of the present invention is to solve the above-mentioned problems and to provide a coil apparatus for a linear-motor railway system, in which the number of ground coils can be decreased in order to decrease the number of man-hours required for installation, as well as to facilitate inspection and maintenance of contact points through reduction in the number of the connection points.

To achieve the above object, the present invention provides a coil apparatus for a linear-motor railway system which comprises six superconductive coils mounted on a bogie of a vehicle at a predetermined pitch such that N and S poles are alternately formed; ground coils disposed on either sidewall of a guideway, each of the ground coils providing propulsion, levitation, and guide functions, and each set of three ground coils corresponding to a pair of adjacent superconductive coils that form N and S poles; and a feeder circuit connected to the ground coils.

The predetermined pitch of the superconductive coils may be about 0.9 meter, and the pitch of the ground coils may be about 0.6 meter. The bogie may have a length of about 5.4 meters or about 8.1 meters. The feeder circuit may be a quadruple feeder circuit.

DESCRIPTION OF THE PREFERRED EMBODIMENTS

The embodiments of the present invention will next be described in detail with reference to the drawings.

Figure 1:
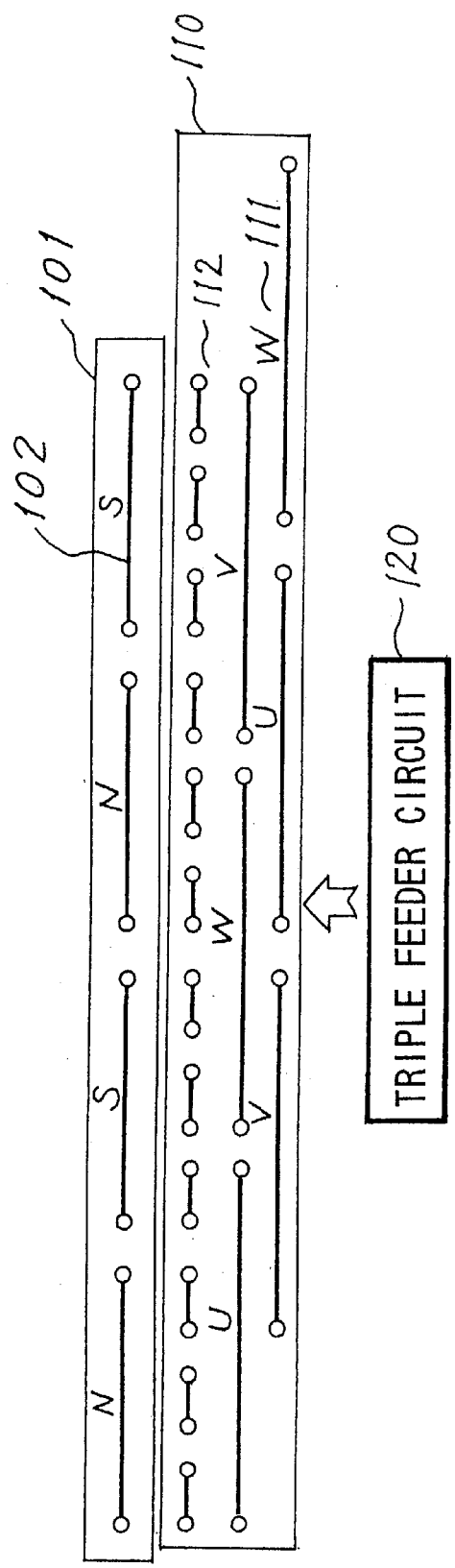
FIG. 1 is a schematic diagram showing the arrangement of superconductive coils on a vehicle of a conventional linear-motor railway system, as well as the arrangement of ground coils on the ground.
Figure 2:
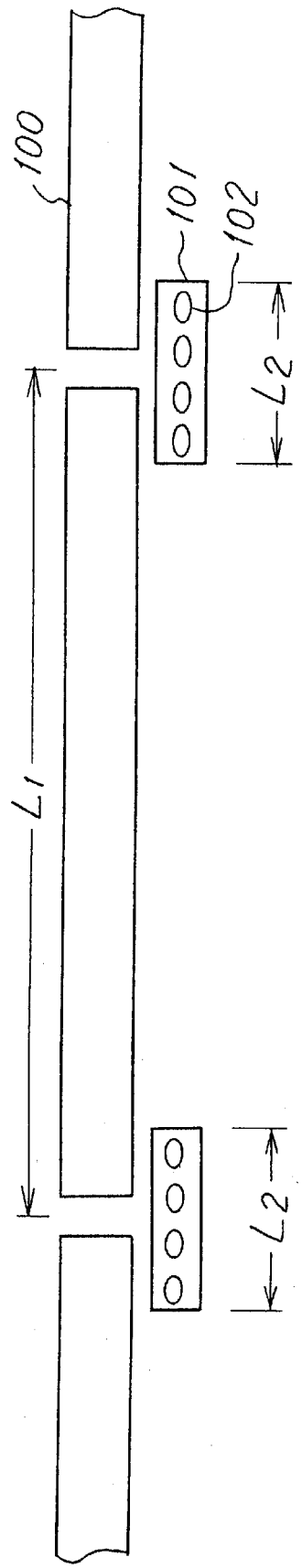
FIG. 2 is a schematic diagram showing the arrangement of the superconductive coils on the vehicle of the conventional linear-motor railway system.
Figure 3:
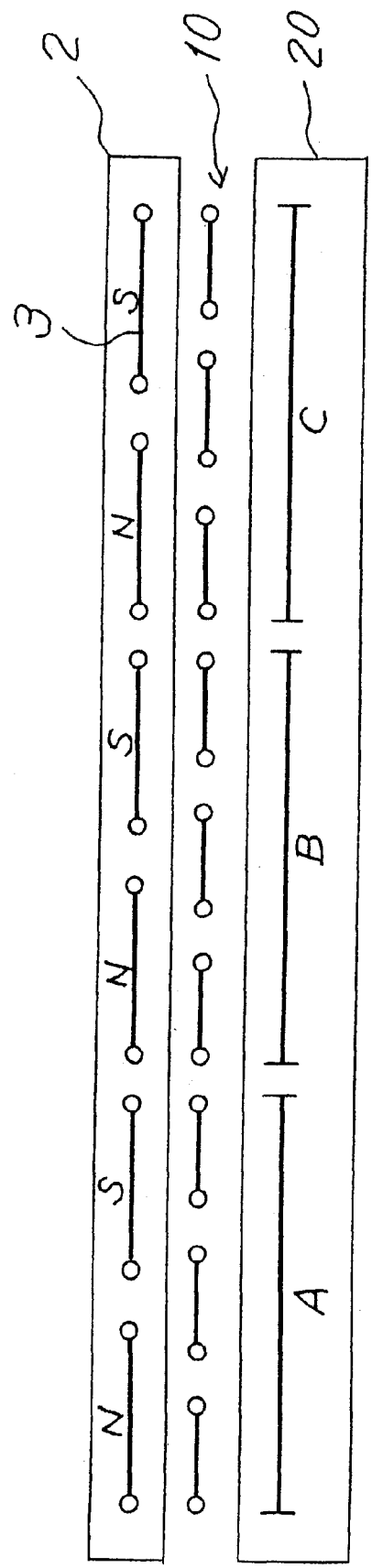
FIG. 3 is a schematic diagram showing the arrangement of superconductive coils on a vehicle as well as the arrangement of ground coils on the ground in a linear-motor railway system according to an embodiment of the present invention.
Figure 4:
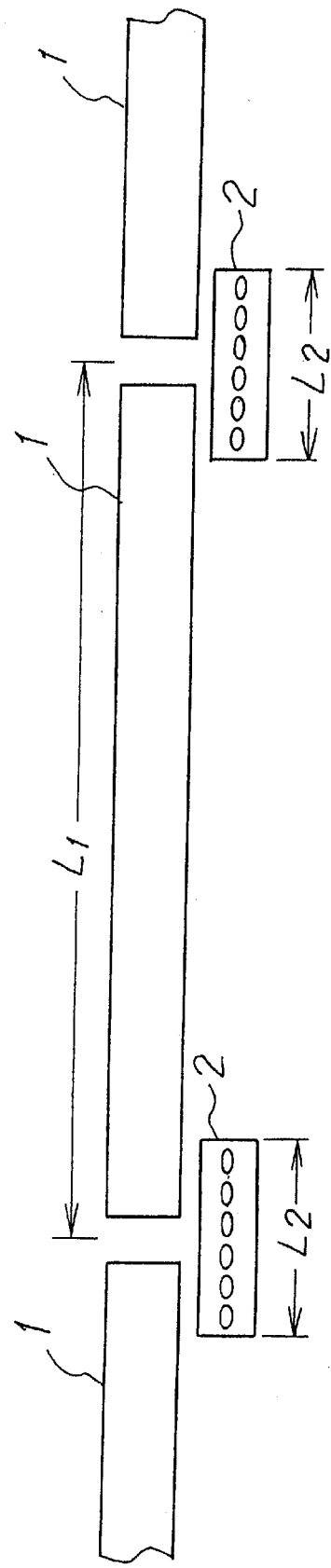
FIG. 4 is a schematic diagram showing the arrangement of the superconductive coils on the vehicle of the linear-motor railway system of the embodiment.

FIG. 3 is a schematic diagram showing the arrangement of superconductive coils on a vehicle as well as the arrangement of ground coils on the ground in a linear-motor railway system according to an embodiment of the present invention. FIG. 4 is a schematic diagram showing the arrangement of the superconductive coils on the vehicle of the linear-motor railway system. These drawings depict only the arrangement on one side of the vehicle, and, needless to say, identical superconductive coils and ground coils are disposed on the vehicle and on the ground, respectively, on the opposite side of the vehicle.

In these drawings, reference numeral 1 denotes a vehicle of a linear-motor railway system (the length $L_1$ of the vehicle is 21.6 meters). Reference numeral 2 denotes a bogie for the vehicle (the length $L_2$ of the bogie is 5.4 meters). Reference numeral 3 denotes superconductive coils disposed on the bogie 2. In the present embodiment, six superconductive coils 3 are mounted at a pitch of 0.9 meter such that N-poles and S-poles (six poles in total) are formed alternately.

Ground coils 10 of the PLG scheme are disposed on the ground side such that three ground coils 10 correspond to each pair of superconductive coils 3 that form N and S poles. For each bogie, nine ground coils 10 are disposed at a pitch of 0.6 meter in order to be connected to a quadruple feeder circuit 20.

The respective portions of the embodiment and the PLG scheme will be described in detail.

Figure 5:
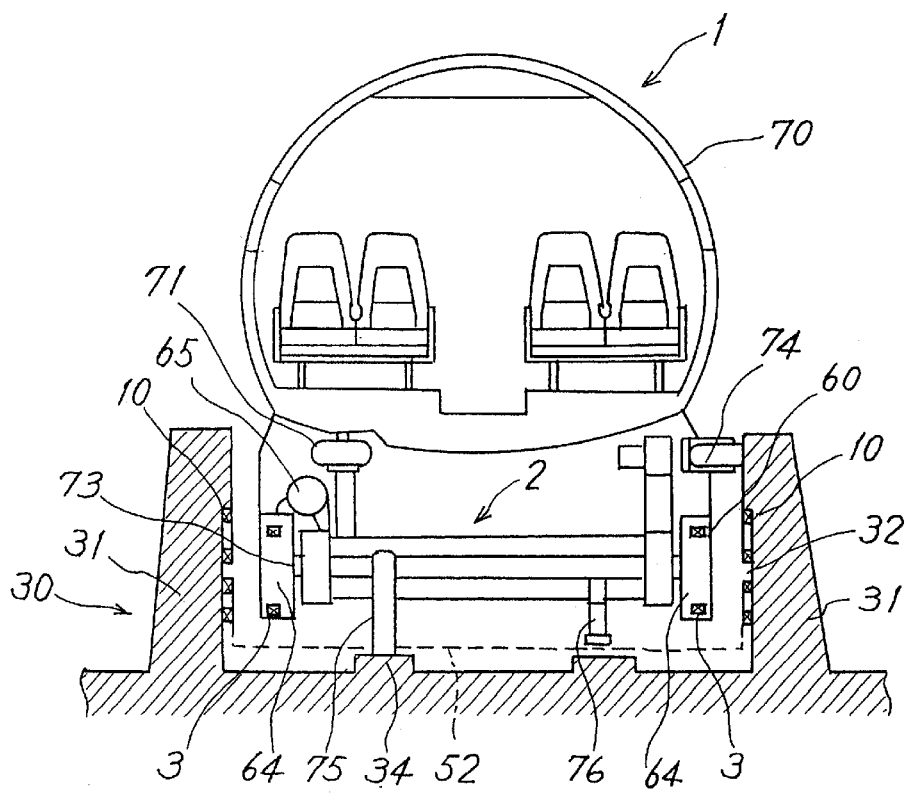
FIG. 5 is a schematic sectional view of the linear-motor railway system employing the present invention.
Figure 6:
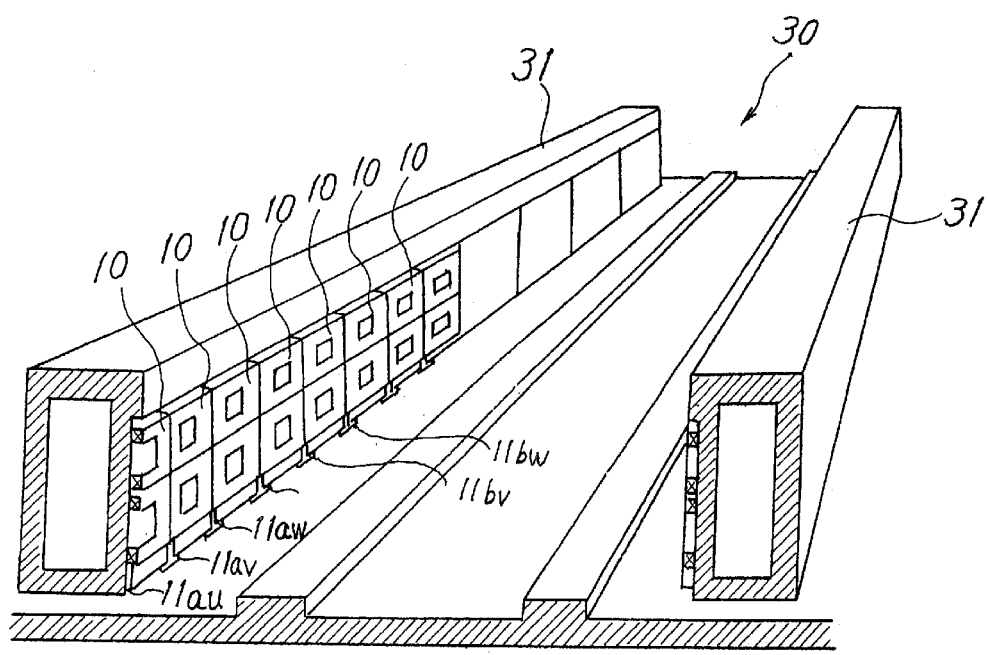
FIG. 6 is a perspective view showing the state of installation of ground coils of the linear-motor railway system of FIG. 5.

As shown in FIGS. 5 to 9, only the ground coils 10 are disposed in recesses 32 formed in opposite sidewalls 31 of a U-shaped guideway 30. Each of the ground coils 10 is resin-molded and provides propulsion, levitation, and guide functions (i.e., the PLG scheme). The ground coils 10 are disposed at a pitch of 0.9 meter along the U-shaped guideway 30. Three-phase electricity is supplied to the ground coils 10 from a quadruple feeder circuit comprising A, B, C, and D feed systems. For receipt of three-phase electricity, the receptive phase coils are connected to the respective feed systems of the feeder circuits via lead wires 11au, 11av, 11aw, 11bu, 11bv, 11bw . . . As shown in FIG. 5, the coils on one sidewall are connected to those on the other sidewall via a feeder line and a null flux line 52

As shown in FIG. 5, the bogie 2 is disposed under a body 70 of the vehicle 1, and air cushions 71 are interposed between the bogie 2 and the body 70. A superconductive device 60 including superconductive coils 3, cryostats 64, and a helium tank 65 is mounted on a frame 73 of the bogie 2. Further, an auxiliary guide device 74, an auxiliary support device 75, an emergency landing device 76, etc., are also provided. Reference numeral 34 denotes a guideway for wheels.

Figure 8:
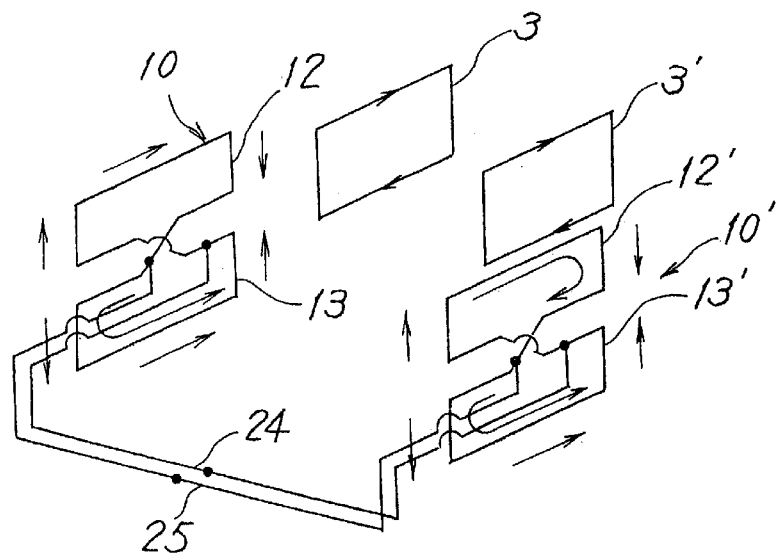
FIG. 8 is an explanatory view for describing levitation by the PLG scheme ground coils shown in FIG. 6.
Figure 9:
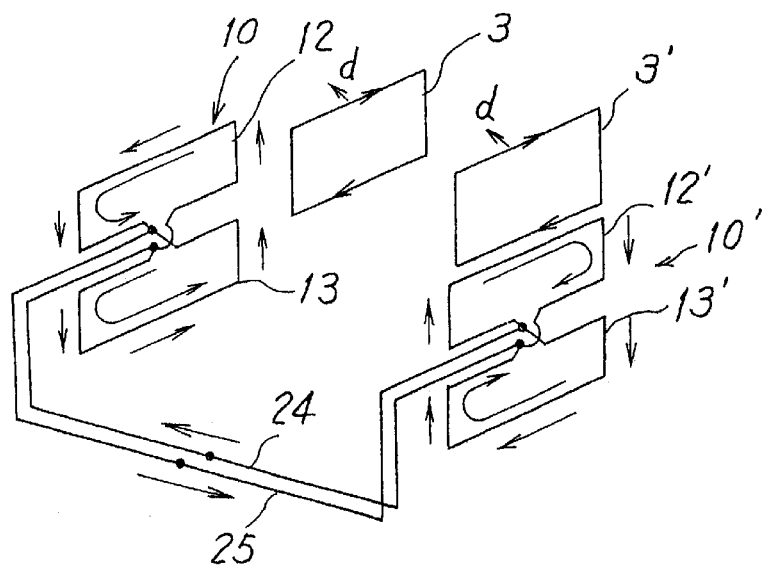
FIG. 9 is an explanatory view for describing guide by the PLG scheme ground coils shown in FIG. 6.

The structure of the PLG scheme ground coils used in the linear-motor railway system according to the present invention will be described in detail with reference to FIGS. 7 to 9.

Figure 7:
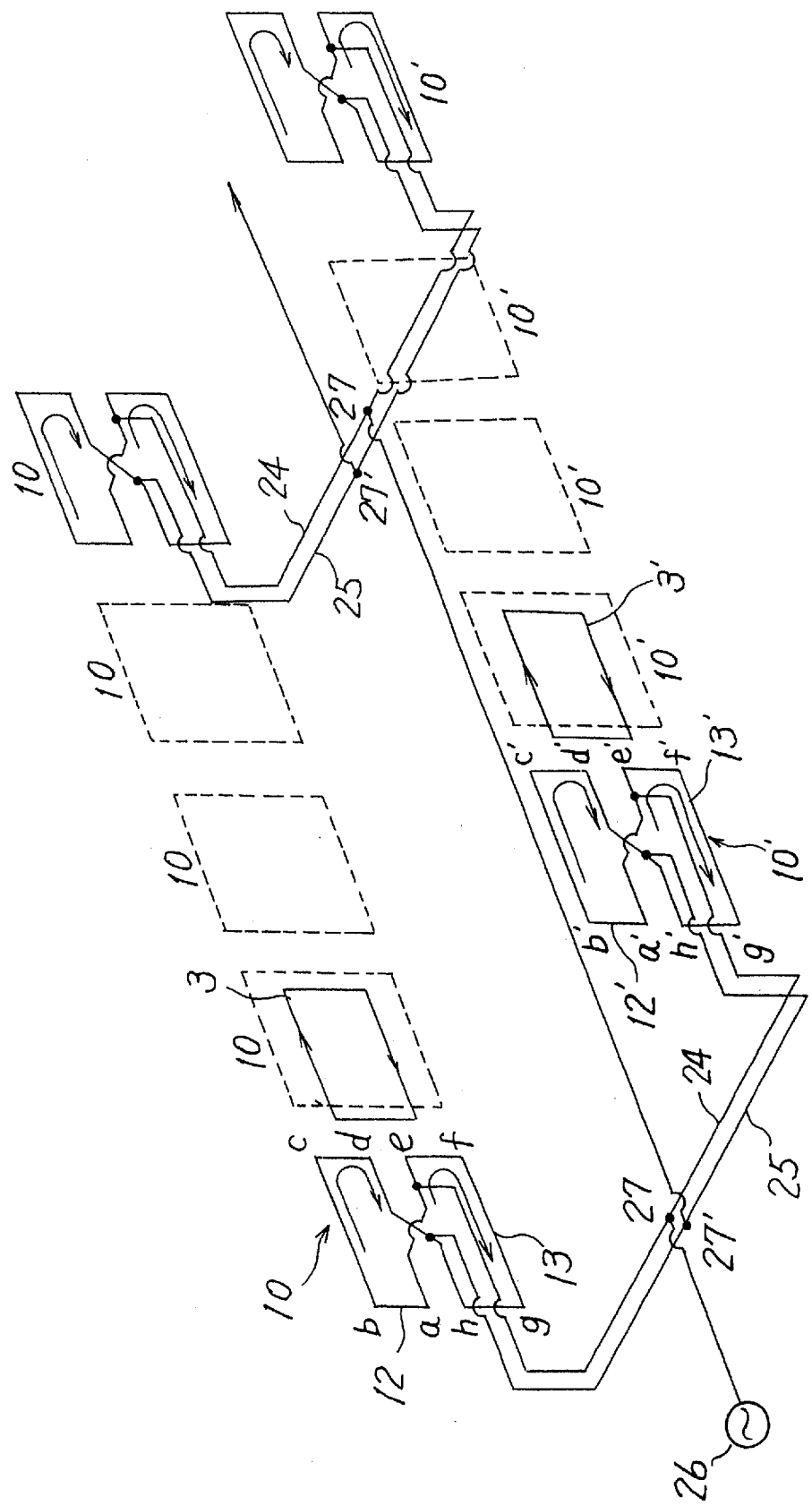
FIG. 7 is an explanatory view for describing propulsion by the PLG scheme ground coils shown in FIG. 6.

In FIG. 7, reference numerals 10 and 10' denote PLG scheme ground coils, which are successively disposed on the opposite inner walls of the U-shaped guideway 30 at predetermined intervals along the travel direction of the vehicle such that the ground coils 10 and 10' face each other. Each of the ground coils 10 (10') includes an upper coil 12 (12') and a lower coil 13 (13') having the same shape and dimensions. Each upper coil 12 (12') is connected to the corresponding lower coil 13 (13') by means of null flux connection. Also, each ground coil 10 is connected by means of flux connection to the corresponding ground coil 10' on the opposite inner wall of the U-shaped guideway 30. As mentioned above, in the present embodiment the upper coils 12, (12') and the lower coils 13, (13') are identical in shape and dimensions; however, the upper coils 12, (12') and the lower coils 13, (13') may be formed to have different shapes and different dimensions.

When the vehicle 1 is in contact with the ground via auxiliary wheels, the vertical center of each ground coil 10 and the vertical center of the corresponding superconductive coil 3 are located on a common horizontal line. The upper coil 12 (12') and the lower coil 13 (13') are disposed symmetrically with respect to a certain point on the horizontal line. The ground coils 10' and the ground coils 10 are identical in structure and arrangement. The upper coils 12' correspond to the upper coils 12, and the lower coils 13' correspond to the lower coils 13.

A power supply 26 is connected to connection lines 24 and 25 which establish null flux connection between the upper coils 12 and 12' as well as between the lower coils 13 and 13'. FIG. 7 shows the circuit configuration for only one phase of the three-phase power supply. When the power supply 26 is turned on, electric current flows as shown in FIG. 7. The current flows into the ground coil 10 via a connection point 27 of the connection line 24, so that the current flows through point a, point b, point c, and point d, in this sequence, and then reaches a connection point 27' of the connection line 25, and the current also flows through point e, point f, point g, and point h, in this sequence, and reaches the connection point 27' of the connection line 25. The current also flows into the ground coil 10' via a connection point 27 of the connection line 24, so that the current flows through point a', point b', point c', and point d', in this sequence, and reaches the connection point 27' of the connection line 25, and the current also flows through point e', point f', point g', and point h', in this sequence, and reaches the connection point 27' of the connection line 25. That is, within the coils 12, 13, 12', and 13', the current flows in the same direction as indicated by arrows, so that an electromagnetic force toward the forward direction of the vehicle 1 is generated between the vertical side portions of the superconductive coils 3 and 3' and the vertical side portions of the ground coils 10 and 10' (i.e., the side between a and b, the side between c and d, the side between e and f, the side between g and h, the side between a' and b', the side between c' and d', the side between e' and f', and the side between g' and h'). Thus, propulsion force is generated.

Meanwhile, levitation force is generated as follows. As shown in FIG. 8, when the vehicle 1 travels while the wheels are in contact with the guideway, the above-described positional relationship is established between the superconductive coils 3 and 3' and the ground coils 10 and 10'. Further, the upper coils 12 and the lower coils 13 are connected through null flux connection and the upper coils 12' and the lower coils 13' are connected through null flux connection. Therefore, the interlinkage flux and current in the ground coils 10 and 10' are both zero, and the electromagnetic travel resistance is also zero.

When the vehicle 1 travels in a levitated state, the vertical centers of the superconductive coils 3 and 3' mounted on the bogie of the vehicle 1 move below the centers of the ground coils 10 and 10' so that a difference is produced between the interlinkage flux produced between the upper coils 12 and the superconductive coils 3 and that produced between the lower coils 13 and the superconductive coils 3. Similarly, a difference is produced between the interlinkage flux produced between the upper coils 12' and the superconductive coils 3' and that produced between the lower coils 13' and the superconductive coils 3'. As a result, electric current as shown in FIG. 8 is induced, so that repulsive force and attractive force are generated at horizontal side portions of the respective coils 12, 13, 12', and 13'. Thus, a levitation force is generated in order to return the superconductive coils 3 and 3' upwardly to a position where the levitation force balances with the weight of the vehicle 1.

When the vehicle 1 is located at the center of the U-shaped guideway 30, the superconductive coils 3 and 3' are disposed symmetrically with respect to the longitudinal center line of the guideway 30, and the upper coils 12 and 12' and the lower coils 13 and 13' are connected through null flux connection via connecting lines 24 and 25. Therefore, when the vehicle 1 is magnetically levitated, the interlinkage flux does not become zero even when the vehicle 1 moves laterally. However, the interlinkage flux in the ground coils 10 is equal to that in the ground coils 10', and consequently no current flows through the connecting lines 24 and 25. Therefore, no transverse force is generated.

By contrast, when the vehicle 1 moves, for example, leftward in FIG. 7 while traveling in a levitated state, a difference is produced between the interlinkage flux produced between the superconductive coils 3 and the upper and lower coils 12 and 13 and that generated between the superconductive coils 3' and the upper and lower coils 12' and 13'. As a result, electric current as shown in FIG. 9 is induced, so that a guide force is generated to return the superconductive coils 3 and 3' to the center.

Figure 10:
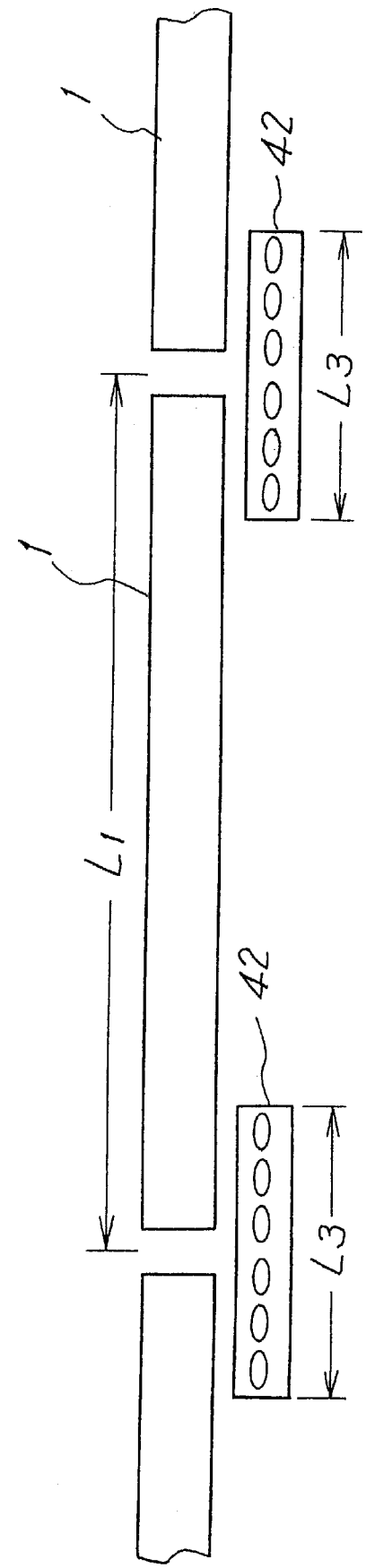
FIG. 10 is a schematic diagram showing the arrangement of superconductive coils on a vehicle of a linear-motor railway system according to another embodiment of the present invention.

FIG. 10 is a schematic diagram showing the arrangement of superconductive coils on a vehicle of a linear-motor railway system according to another embodiment of the present invention.

In the present embodiment, the length $L_3$ of the bogie 42 of the vehicle 1 is increased such that the superconductive coils 3 have the same length and pitch as do those of the conventional linear-motor railway system. That is, the pitch of the superconductive coils 3 is set to 1.35 meters, and the length $L_3$ of the bogie 42 is set to 8.1 meters.

As described above, the linear-motor railway system according to the present invention has the following structural features.

(1) The number of superconductive coils that are disposed on each side of each bogie to alternately form N and S poles is set to 6 (6 poles). That is, the total number of superconductive coils disposed on both sides of each bogie is 12 (12 poles).

(2) The number of PLG-scheme ground coils that are disposed on each side of the guideway for each bogie is set to 9. That is, the total number of ground coils disposed on the guideway for each bogie is 18.

(3) Supply of electricity to the ground coils is performed in a quadruple feeder scheme, and each bogie is driven by three feed systems.

Also, in the present invention, there can be decreased the load that acts on the ground coils when a superconductive coil becomes quenched.

Figure 11:
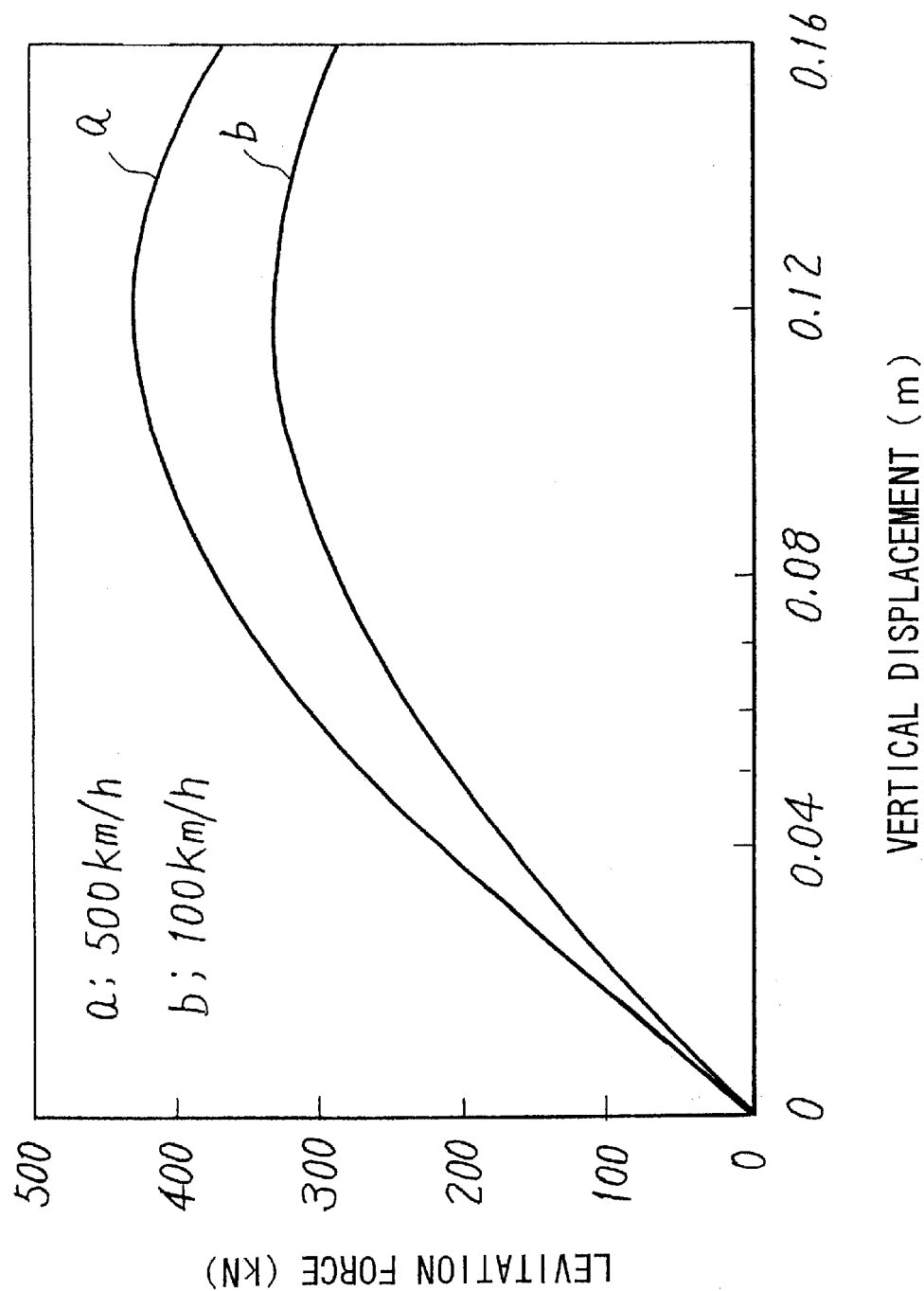
FIG. 11 is a graph showing the relationship between vertical displacement and levitation force generated by supercondutive coils in the linear-motor railway system according to the present invention.

FIG. 11 is a graph showing the relationship vertical displacement versus levitation force generated by superconductive coils for the case where the weight of the vehicle is 20 tons. The vertical axis represents levitation force (kN), and the horizontal axis represents vertical displacement (m). Curve a shows the case where the vehicle travels at 500 km/h, whereas curve b shows the case where the vehicle travels at 100 km/h.

As shown in FIG. 11, in the case where the vehicle travels at 500 km/h (curve a), the nominal or proper value of the vertical displacement is 0.04 m. However, when the number of the superconductive coils is reduced from 6 (6 poles) to 5 (5 poles); i.e., becomes 5/6 the nominal number of coils, the vehicle balances at a position where the vertical displacement increases to about 0.048 m (=0.04 m×6/5).

Further, since the pitch angle of the bogie decreases considerably as compared with the case of 4 poles, the risk of the vehicle coming into contact with the ground becomes very small.

The present invention is not limited to the above-described embodiment. Numerous modifications and variations of the present invention are possible in light of the spirit of the present invention, and they are not excluded from the scope of the present invention.

As mentioned above, the present invention provides the following advantageous effects:

(1) The number of ground coils per bogie can be halved in comparison with the case of a conventional vehicle. In other words, the number of ground coils can be reduced from 36 to 18 per bogie.

(2) When a quadruple feeder system is used instead of a triple feeder system, the capacity of power supply can be decreased to 8/9 the nominal value. In addition, when a quadruple feeder system is used, the respective electricity feed systems correspond to the 6-pole superconductive coils in a well-balanced manner, so that the respective electricity feed systems can obtain balanced induced voltages. Accordingly, even if a train is composed of vehicles having different lengths (different bogie pitches), the respective feed systems do not enter into an unbalanced state, and can obtain balanced, stable induced voltage.

(3) The load of the ground coils can be reduced. For example, if the drive voltage is held constant, the drive current can be reduced to 2/3 the nominal value.

(4) The load imposed on the ground coils when one of the superconductive coils becomes quenched can be reduced. Accordingly, the design strength of the guideway can be decreased. Since the number of superconductive coils is increased from 4 to 6, there can be decreased the change in magnetic field induced when the vehicle meets another vehicle traveling along an adjacent guideway.

(5) The magnetic field in the vehicle can be reduced in strength.

(6) The levitation start speed can be decreased. That is, in a straight section the increase in the number of superconductive coils from 4 to 6 decreases the levitation start speed to about 2/3.

(7) Even when a superconductive coil disposed on one side of a bogie becomes quenched, the vehicle can be caused to travel in a levitated manner after a corresponding superconductive coil disposed on the opposite side of the bogie is forcedly demagnetized. Thus, reduction of transportation capacity due to coil quenching can be minimized.

What is claimed is:

1. A coil apparatus for a linear-motor railway system comprising:

(a) a bogie of a vehicle having a length of about 5.4 meters;

(b) six superconductive coils mounted on the bogie at a predetermined pitch of about 0.9 meter such that N and S poles are alternately formed;

(c) ground coils disposed on either sidewall of a guideway at a pitch of about 0.6 meter, each of said ground coils providing propulsion, levitation, and guide functions, and each set of three ground coils corresponding to a pair of adjacent superconductive coils that form N and S poles; and (d) a feeder circuit connected to said coils.

2. A coil apparatus for a linear-motor railway system according to claim 1, wherein said feeder circuit is a quadruple feeder circuit.

* * * * *